United States Patent [19]

Echterling et al.

[11] Patent Number: 5,036,145

[45] Date of Patent: Jul. 30, 1991

[54] ALKOXYSILANE AND ALKOXYSILANE TERMINATED POLYAMIC OR POLYIMIDE LACQUER COMPOSITION

[75] Inventors: Garry K. Echterling, Bausman; John E. Herweh, Lancaster, both of Pa.

[73] Assignee: Armstrong World Industries, Inc., Lancaster, Pa.

[21] Appl. No.: 377,114

[22] Filed: Jul. 10, 1989

[51] Int. Cl.[5] .............. C08L 77/00

[52] U.S. Cl. .............. 525/431; 528/26; 528/38; 549/214; 548/406

[58] Field of Search .............. 548/406; 549/214; 528/26, 38; 525/431

[56] References Cited

U.S. PATENT DOCUMENTS

| | | | |
|---|---|---|---|
| 3,811,918 | 5/1974 | Levene | 117/47 H |
| 4,346,131 | 8/1982 | Yoldas | 428/35 |
| 4,480,072 | 10/1984 | Mallon | 525/61 |
| 4,511,705 | 4/1985 | Makino et al. | 528/38 |
| 4,731,264 | 3/1988 | Lin et al. | 427/387 |
| 4,758,476 | 7/1988 | Sekine et al. | 528/26 |
| 4,818,806 | 4/1989 | Kunimune et al. | 528/38 |

OTHER PUBLICATIONS

Dislich, Helmut, Sol-Gel Derived Dip Coatings, Schott Glaswerke, Hattenbergstr. 10, 6500 Mainz, FRG, pp. 261-268.

Schmidt, H. K., Organically modified Silicates as Inorganic-Organic Polymers, Fraunhofer-Institut fur Silicatforschung, Wurzburg, FRG, pp. 102-103 23 Chemical Abstracts 18, 107:178273g, (1987).

*Primary Examiner*—Melvin I. Marquis
*Assistant Examiner*—M. Glass

[57] ABSTRACT

An alkoxysilane bearing amic acid or derivative thereof is formed by reacting an aromatic or aliphatic dianhydride and an aminoalkyltrialkoxysilane or aminoaryltrialkoxysilane, or reacting an aromatic or aliphatic dianhydride and a diamine to form an amic acid which is reacted with an aminoalkylenetrialkoxysilane. A thin, hard protective silica glass network is formed by reacting the alkoxysilane bearing amic acid with an alkoxysilane, preferably tetraalkoxysilane, and an epoxy bearing silane coupling agnet in an acid catalyzed sol-gel process involving hydrolysis and condensation, which provides an amide/ester modified silica network. In a variation of this process, a polyamic acid bearing anhydride termination is prepared by reacting an excess of a dianhydride with a diamine. The product of this reaction when reacted with an aminoalkylenetrialkoxysilane provides an alkoxysilane bearing oligomeric polyamic acid. The latter product yields an imide modified silica network when subjected to acid catalyzed hydrolysis and condensation with tetraalkoxysilane.

18 Claims, No Drawings

ALKOXYSILANE AND ALKOXYSILANE TERMINATED POLYAMIC OR POLYIMIDE LACQUER COMPOSITION

FIELD OF THE INVENTION

The present invention relates to, coating composition containing the amic acid derivatives and floor covering products having a protective coating of the hydrolysis and condensation product of the amic acid derivatives. More particularly, the invention relates to novel coating compositions which provide stain and gloss protection when applied as a clear, protective layer.

BACKGROUND OF THE INVENTION

From the mid-1940's, it was known that metal alkoxide could be hydrolyzed and condensed to form glasses. Subsequently, from about the mid-1970's, it was known that silica could be produced in situ as a chemical product of compounds such as tetraethoxysilane (TEOS).

It was previously known from U.S. Pat. No. 3,811,918 to partially acid hydrolyze silicon alkoxide and add metal oxide to prepare a glass precursor which could be fired to a glass composition at a temperature above 1000° C. Further U.S. Pat. No. 4,346,131 describes the preparation of a clear alcohol solution of acid hydrolyzed metal alkoxide which can be coated on a substrate and dried to produce an optical coating.

Silane coupling agents, including TEOS, as disclosed in U.S. Pat. No. 4,480,072, provided a useful means to crosslink hydroxylated polymers.

An article on SOL-GEL DERIVED DIP COATINGS by Helmut Dislich of Schutt Glaswerke, Hattenbergstr. 10, 6600 Mainz, Federal Republic of Germany, discloses how mixtures of metal alkoxides may be used to condense mixed metals on a glass surface such as silicon-titanium, aluminum-magnesium, cadmium-tin and indium-tin. An article on ORGANICALLY MODIFIED SILICATES AS INORGANIC-ORGANIC POLYMERS by H. K. Schmidt of Fraunhofer-Institut fur Silicatforschung, Wurzburg, Federal Republic of Germany, describes combinations of linear organic polymer networks with three dimensional tetrahedron silicon structures using the sol-gel process, e.g. where combined polymerization of methacrylate and condensation of $Ti(OR)_4$/$Si(OR)_4$/epoxy-$Si(OR)_3$ produce a reinforced system with increased tensile strength and scratch resistance.

Japanese Application 86/25,739 discloses antifogging tile coatings where silica is bonded to polyvinyl alcohol using hydrolyzed [3-(glycidyloxy)propyl]trimethoxysilane.

Lin et al, U.S. Pat. No. 4,731,264, discloses an organoalkoxysilane/alumina coating composition which is applied to a plastic transparency. The coating composition is the reaction product of an alumina sol prepared by mixing aluminum isopropoxide and glacial acetic acid, methyl triethoxysilane and gamma glycidoxypropyl trimethoxysilane.

SUMMARY OF THE INVENTION

The invention is directed to the use of alkoxysilane terminated amic acid or derivative to form a lacquer composition, protective coatings formed by the hydrolysis and condensations of the amic acid or derivative, and products having the protective coating including floor covering products.

The amic acid may be the reaction product of an aromatic or aliphatic dianhydride and an amino alkyltrialkoxysilane or aminoaryltrialkoxysilane. The resulting alkoxysilane bearing amic acid is mixed with an alkoxysilane, preferably tetraalkoxysilane, and an epoxy bearing silane coupling agent. This composition may be reacted by an acid catalyzed sol-gel process involving hydrolysis and condensation to yield a thin, hard protective amide/ester modified silica glass network.

In another embodiment, an amic acid is prepared by reacting an excess of an aromatic or aliphatic dianhydride and a diamine. The alkoxysilane bearing amic acid is prepared by reacting the previously formed amic acid having anhydride functionality with an aminoalkylenetrialkoxysilane. Dehydration of the alkoxysilane bearing amic acid yields an alkoxysilane terminated polyimide Which yields an imide modified silica glass network when subjected to acid catalyzed hydrolysis and condensation with the tetraalkoxysilane.

Cyclic imides are typically stiff, planer structures and help impart hardness to the overall structure. Further, imides have excellent high temperature stability.

Both embodiments yield an organic/inorganic hybrid glass. The organic component may be an amide/ester moiety or an imide moiety. The inorganic component is not limited to a silicon glass, although silicon glass is presently preferred.

DETAILED DESCRIPTION OF THE INVENTION

Sol-gels based on alkoxysilanes give rise to inorganic glasses ($SiO_2$) at moderate temperatures. These glasses, however, are typically brittle, crack readily and are therefore, not suitable as a coating, particularly as a coating for a wear surface. In order to moderate this characteristic and make these otherwise hard coatings suitable for wear surfaces, organic structures can be introduced. The organic structures can act to (a) reduce network connectivity and thereby increase its relaxation ability, and (b) reduce the interaction between water and the network structure, thus reducing stress during curing and densification process.

The reaction of aromatic and aliphatic dianhydrides with diamines (both arylene and alkylene) at various mol ratios wherein the dianhydride is in excess yields oligomeric polyamic acids having anhydride end groups. These reaction products are subsequently reacted with an amino(alkyl or aryl)trialkoxysilane to give oligomeric polyamic acids terminated with reactive alkoxysilane groups. Incorporation of these latter products in coating formulations with alkoxysilanes and thermal treatment at about 200° C. provides for imide formation and concomitant modification of the silica network. The resulting thin, hard hybrid coating provides exceptional stain and scratch resistance.

The aromatic or aliphatic dianhydride (e.g. pyromellitic dianhydride (PMDA) and dianhydride of butanetetracarboxylic acid (BTCADA)) is added to a stirred solution of the diamine (e.g. hexamethylene diamine and bis(3-aminopropyl)tetramethyldisiloxane) in a dried aprotic solvent (e.g. N,N-dimethylacetamide (DMAC) and N,N-dimethylforamide (DMF)). The mol ratio of anhydride to amine being greater than one so that the oligomeric product is terminated by anhydride groups.

This product is subsequently reacted with a molar amount of an amino bearing alkoxysilane, preferably an amino $(C_2-C_4)$alkyltri$(C_1-C_3)$alkoxysilane (e.g. 3-aminopropyltriethoxysilane), equivalent to the anhydride associated with the oligomeric polyamic acid. This product, an alkoxysilane terminated oligomeric polyamic acid, when combined with a alkoxysilane (e.g. tetraethoxysilane, TEOS) and in the presence of a 0.1% aqueous HCl solution to catalyze hydrolysis and condensation of the alkoxysilane and hydroxysilane groups yields a coating lacquer.

The lacquer upon dilution with a mixture of water and isopropanol and the addition of 0.25% by weight of a surfactant based on poly(dimethylsiloxane) is "aged" or heated at 60° C. for a period of time to provide a clear, homogeneous solution. The resulting lacquer is sprayed, blade coated or flood coated onto a substrate (e.g. glass plate) and air dried, followed by heating at 150° F. prior to heating at 392° F. (200° C.) for varying periods of time. The cured coating produced in this manner consists of a silica network modified by organic structures containing cyclic imide groups.

Specific examples are shown by the following equations:

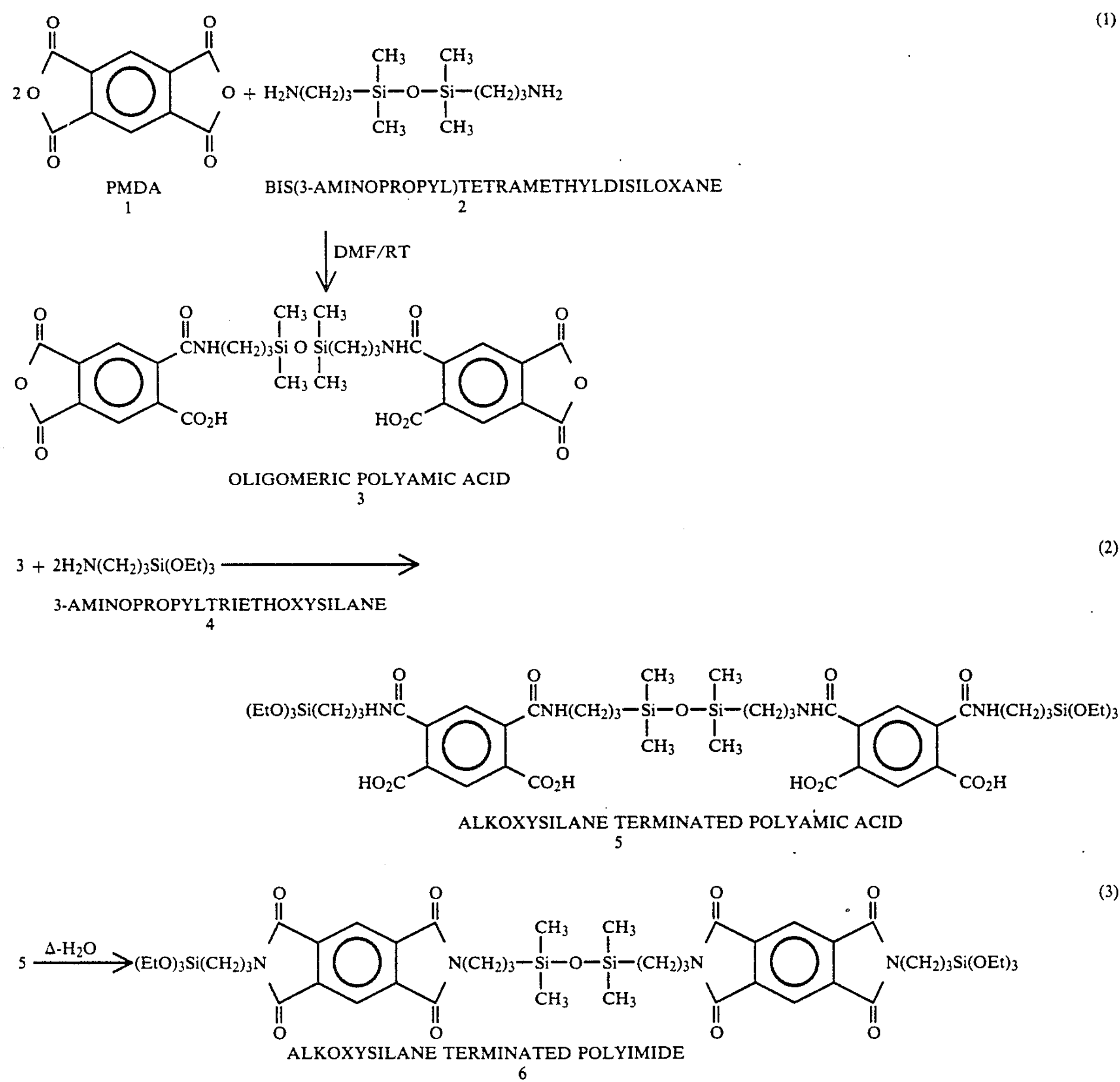

-continued
(4)
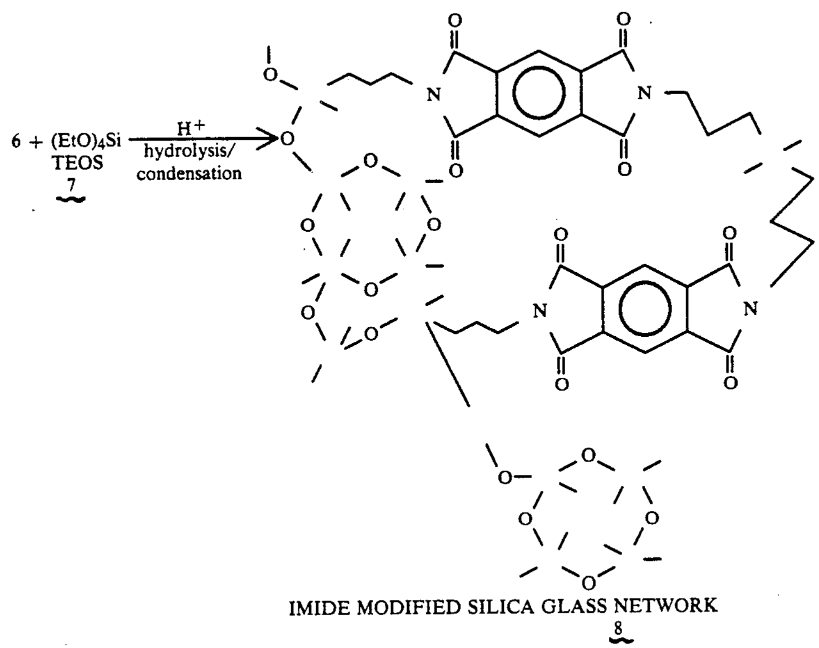
(1')
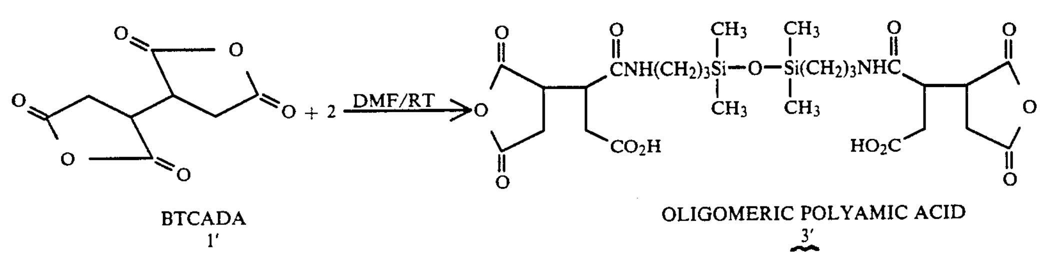
(2')
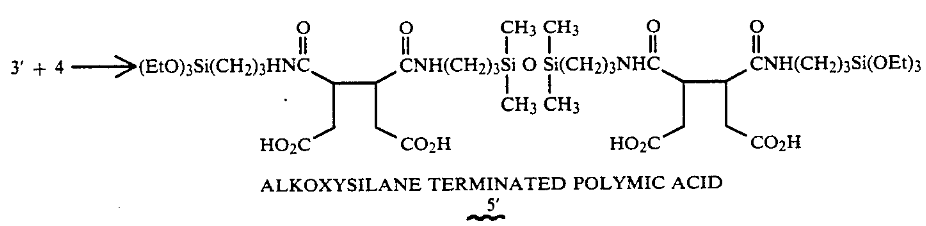
(3')
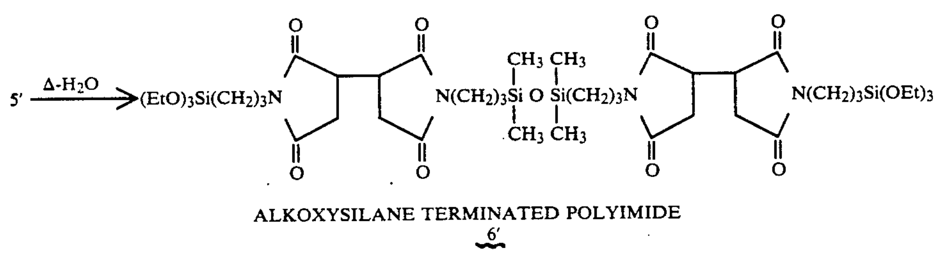
(1'')
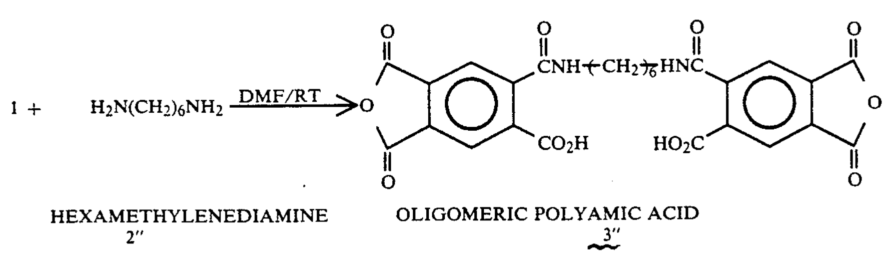

-continued (1''')

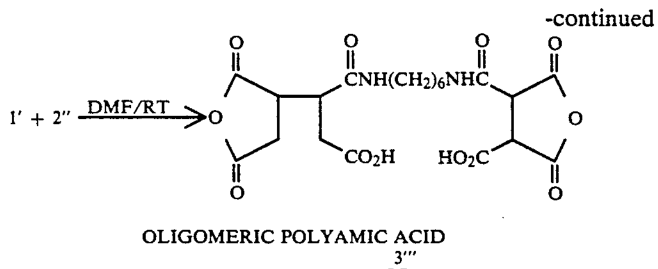

OLIGOMERIC POLYAMIC ACID
3'''

PMDA (excess) when reacted with bis(3-aminopropyl)tetramethyldisiloxane followed by reaction with 3-aminopropyltriethoxysilane gives an akloxysilane terminated oligomeric polyamic acid that when formulated with tetraethoxysilane (TEOS) provides for the best hybrid coatings. The most advantageous conditions for preparation of the alkoxysilane terminated oligomeric polyamic acid are to add the dianhydride to a solution of the diamine in DMF at room temperature using an excess of the anhydride. After allowing the reaction product, typically a clear solution, to stir 16 hours a solution of 3-aminopropyltriethoxysilane (molar quantity sufficient to react with all the anhydride associated with the oligomeric polyamic acid) is added and left to stir at ambient conditions. The percent solids present in the resulting DMF solution should be on the order of 15 to 25%.

A comprehensive formulation for preparing thermally cured hybrid coatings is given below: (all amounts indicated are weight percent and are based on total weight of the coating lacquer):

| | Range | Preferred Range |
|---|---|---|
| Alkoxysilane terminated polyamic acid | 0.1–5.0% | 0.6–1.0% |
| Tetraalkoxysilane | 1–10% | 4–6% |
| Weight percent solids in total coating lacquer composition | 2.5–15% | 4–10% |
| Cure time | 1 min.–30 min. | >15 min. |

EXAMPLE 1

General Procedure for Preparation of Oligomeric Polyamic Acid

All glass equipment used was oven dried four hours at 140° C. and weighing and combining of reagents was carried out in a conditioned dry box. Dianhydride (0.2 mol) was added to a solution of the diamine (0.1 mol) (either hexamethylenediamine or bis(3-aminopropyl)-tetramethyldisiloxane) in DMF (470 ml). The reaction temperature exothermed to about 40° C. and the reaction mixture was left to stir overnight. To the anydride terminated oligomer was added 3-aminopropyltriethoxysilane (0.2 mol) in 35 ml of DMF. After 5.5 hours, a clear homogeneous solution 17–19% solids was retained for the coating formulation.

EXAMPLE 2

General Preparation for Preparation of Lacquer Formulation

The oligomeric polyamic acid of Example 1 in a DMF solution (46 g) was combined with 42 g of TEOS in 14 g of acidified water. The resulting solution was diluted with DMF/i-PrOH/$H_2O$ (40/40/20 by volume) and DC-193 manufactured by Dow Corning Corporation (0.4 g) was added. After aging, the clear lacquers were coated on a glass substrate using either a 3 or 6 mil Bird blade. The coated glass plates were dried at 66° C. for five minutes and then at 200° C. The cured coatings showed excellent stain and scratch resistance.

EXAMPLE 3

Preparation of Alkoxysilane Terminated Oligomeric Polyamic Acid

All glassware was dried as described above and reagent transfer was carried out in a conditioned dry box. To a solution of bis(3-aminopropyl)tetramethyldisiloxane (0.017 mol) in 80 ml of DMF at room temperature under nitrogen was added PMDA (0.034 mol). The reaction exothermed to about 40° C. and was left to stir and cool at room temperature for about 15 hours. To the resulting anhydride terminated oligomer was added 3-aminopropyltriethoxysilane (0.034 mol) in 6 ml of DMF. A slight exotherm (about 8° C.) was observed. After about 5.5 hours, a clear homogeneous solution (18.1% solids) Was retained for the coating formulation.

EXAMPLE 4

| Formulation of an Imide Containing Hybrid Coating | |
|---|---|
| Amic acid | 47 g |
| TEOS | 42 g |
| Acidified $H_2O$ | 14 g |
| DMF/i-PrOH/$H_2O$ | 380 g/314 g/200 g |
| DC-193 | 0.4 g |

A cured coating of 0.1 to 0.3 mil final thickness may be obtained by using either a 3 or 6 mil Bird blade on a suitable substrate. The coated substrate was dried at 66° C. for five minutes and then cured at 200° C. for 15 minutes. The development of characteristic imide absorption bonds at 5.63 and 13.85 microns were followed with time. IR spectra indicated optimum generation of imide occurs after about eight minutes.

The cured coating showed superior stain resistance when compared to currently available coatings. Dynamic scratch testing indicated scratching with grit above 24 mesh. The dynamic scratch test was conducted on a Triboforce Tester. Six by ten inch samples were mounted on a sled that runs on high-speed bearings. A rubber foot, which was mounted on a pivoting arm, rested on the sample. For each run, grit particles of a known and narrow size range were placed between the foot and the sample. The size of the grit particles was varied from 3.0 and 5.0 micron aluminum oxide powder to 7.3, 14.0, 24.0, 44.0 and 110.0 micron silicon carbide powder. The pressure of the foot on the sample was controlled by placing a five pound weight on the foot. The sample was drawn horizontally under the foot by a falling weight. The more scratch resistant the sample, the larger the size of the grit particles required to cause noticeable damage. The samples were examined visually and rated according to the size of grit particles required to cause noticeable damage.

Another embodiment results from the reaction of an aromatic or aliphatic dianhydride with an aminoalkyltrialkoxysilane or aryltrialkoxysilane (½ mol ratio). This reaction yields an amic acid. The amic acid, when formulated with TEOS and 3-glycidoxypropyltrimethoxysilane (GOPTMS) followed by thermal cure gives a thin (<0.2 mil) stain resistant, gloss retentive coating. The thin, hard coating may be applied by flood coating to surfaces such as flooring structures consisting of a keycoated tile or flexible vinyl substrate.

An anhydride such as pyromelltic dianhydride (PMDA) or the dianhydride of butanetetracarboxylic acid (BTCADA) is reacted with an aminoalkylalkoxysilane (one to two mol ratio of anhydride to amine). The product, an amic acid, is combined with a tetraalkoxysilane [e.g. tetraethoxysilane (TEOS)] and a second coupling agent, such as a glycidoxy($C_2$–$C_4$)alkyltri($C_1$–$C_2$)alkoxysilane, preferably 3-glycidoxypropyltrimethoxysilane in the presence of a 0.1% aqueous HCl solution, to catalyze hydrolysis and condensation of the alkoxysilane and hydroxysilane groups respectively. The resulting mixture is diluted with a mixture of water and isopropanol and 0.25% by weight of a surfactant based on poly(dimethylsiloxane). The resulting lacquer is sprayed, blade coated or flood coated onto a substrate and air dried followed by heating five minutes at 150° F. prior to heating at 265° F. The cured coating produced in this manner consists of a silica network modified by organic moieties containing amide and ester functions.

Specific examples are shown by the following equations:

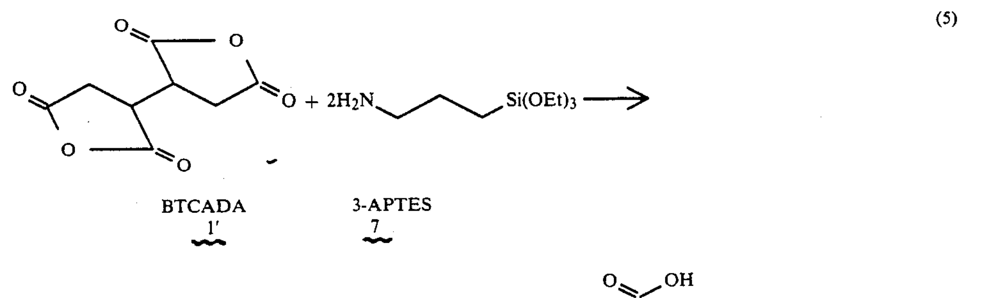

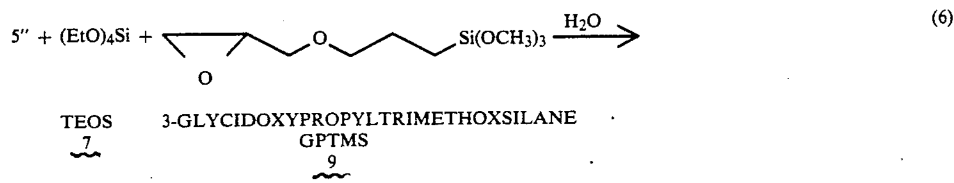

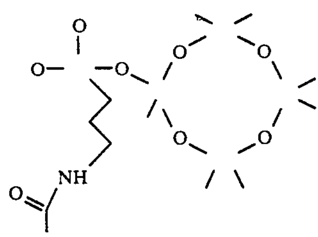

-Si
O-OXYGEN

-continued

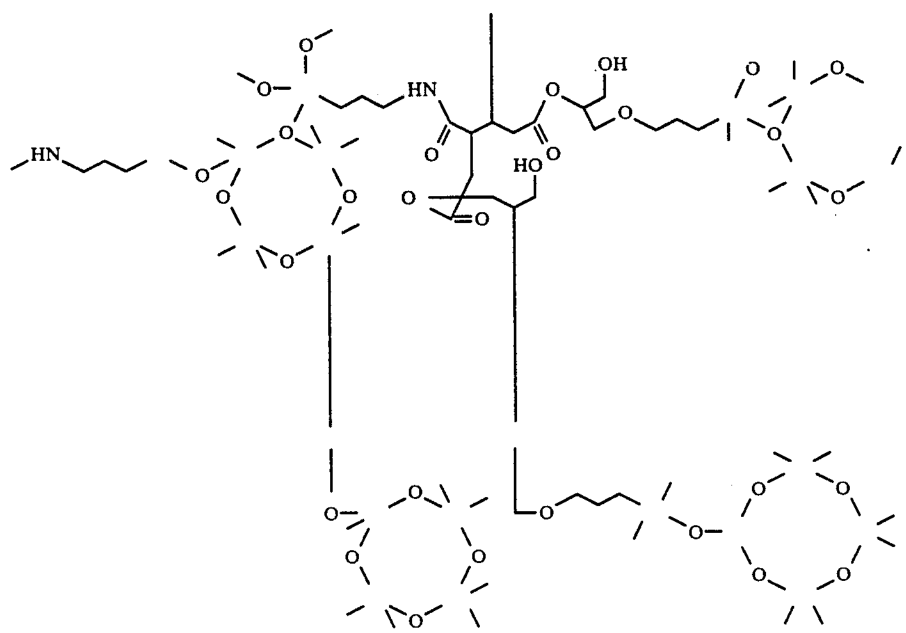

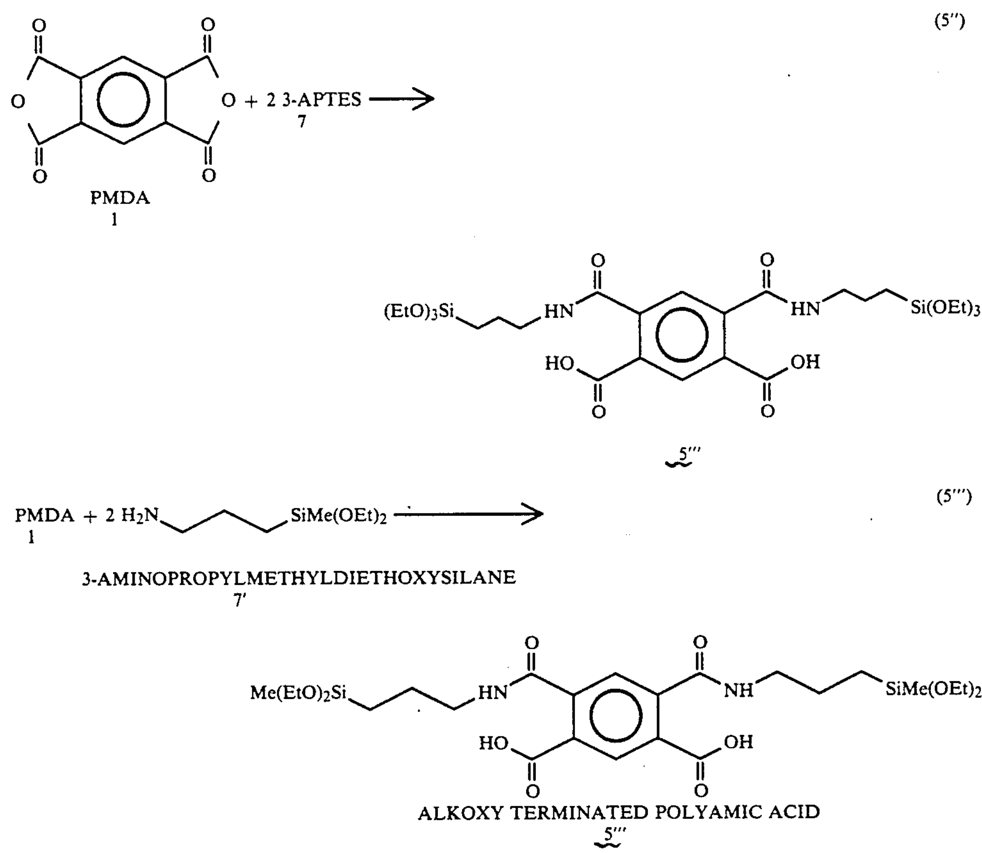

The dianhydride is reacted with the 3-aminopropyltriethoxysilane (APTES) by adding a solution of the dianhydride in DMF to a stirred solution of the amine in DMF at ambient conditions. The resulting solution is allowed to stir for 15 hours at room temperature prior to formulation in the coating composition. The percent solids present in the resulting DMF solution should be on the order of 15 to 25%.

A comprehensive formulation for preparing thermally cured hybrid coatings is given below (all amounts indicated are weight percent and are based on total weight of the coating lacquer):

| | Range | Preferred Range |
|---|---|---|
| Alkoxysilane terminated polyamic acid | 0.1–10% | 1–3.5% |
| Tetraalkoxysilane | 2–20% | 5–6% |
| Coupling agent | 0.1–10% | .25–1.75% |
| Weight percent solids in total coating lacquer composition | 5–20% | 7.5–10% |
| Cure temperature | 100–150° C. | 125–135° |
| Cure time | 1 min–30 min | 15 min |

The amic acid 5'''' based on the reaction of PMDA and APMDES, When incorporated in a hybrid coating composition and cured in the usual manner, gave stain resistance and gloss retention results similar to compositions based on the APTES modified PMDA. The use of APMDES would be expected to somewhat reduce interaction with the silica network. The effects of such proposed reduced interaction were not apparent.

Both the aliphatic and aromatic based amic acid containing hybrid coating compositions performed similarly. All cured hybrid coatings exhibited satisfactory adhesion to the keycoat as determined by the Gardner adhesion test.

EXAMPLE 5

General Procedure for Preparation of Amic Acid

All glass equipment used was oven dried four hours at 140° C. and weighing and combining of reagents was carried out in a dry box. To a stirred solution of the dianhydride (0.1 mol) dissolved in 320 ml of dry DMF at room temperature was added 3-aminopropyltriethoxysilane (0.2 mol). The reaction temperature rose to about 41° C. and a clear, colorless solution resulted within ten minutes after completing the addition. The clear solution of amic acid was left to stir at room temperature under a nitrogen atmosphere for 16 hours. Portions of this solution were used to formulate the coating lacquers.

EXAMPLE 6

General Procedure for Preparation of Flooring Structure

A tile or resilient substrate having the typical filled PVC or fused PVC/PVC plastisol composition was prepared by applying a UV curable coating, usually with a Bird blade at a thickness of two to four mils which has been cured via a dosage of 3 j/cm$^2$ UV. The coated floor structure is then given a spray or flood coat of the hybrid coating lacquer (subject of the invention) sufficient to give after thermal curing a <0.1 mil dry thickness of the hybrid coating.

EXAMPLE 7

Preparation of the Amic Acid Derived from the Reaction of PMDA with 3-Aminopropyltriethoxysilane All glassware was dried as described above in Example 6 and reagent transfer was carried out in a conditioned dry box. To a stirred solution of PMDA (0.025 mol) in 80 ml of dry DMF was added at room temperature and under a nitrogen atmosphere 3-aminopropyltriethoxysilane. A slight exotherm occurred and the clear pale yellow solution of amic acid was left to stir at room temperature. The solids content of the resulting solution was 18.1%.

EXAMPLE 8

| Formulation and Procedure for Preparing Thermally Cured, Hard, Hybrid Coatings | |
|---|---|
| Amic acid (based on BTCADA) - 17.5% solids in DMF | 92.0 g |
| GOPTMS | 6.0 g |
| TEOS | 42.3 g |
| Acidified water | 14.4 g |
| Dilution soln. i-PrOH/$H_2O$ | 491.2 g/122.8 g |
| DC-193 | 0.4 g |

A coating of <0.mil final thickness was obtained by flood coating of the formulation given above on a suitable substrate, drying five minutes at 66° C. (150° C.) prior to heating 15 minutes at about 130° C. (about 265° F.). The performance of the resulting coating was orders of magnitude greater with respect to wear appearance properties than those currently available.

EXAMPLE 9

Optimization of Formulation and Cure

To optimize the formulation and cure conditions, a Taguchi statistically designed experiment was employed focusing on the ratio of amic acid to coupling agent and cure conditions. Example 8 was modified by varying the amic acid to coupling agent to be 0.5, 2.0 and 3.5 based on moles of amic acid and coupling agent; cure temperature at 240°, 265°, and 290° F.; and cure time (oven dwell time) of 5, 10, and 15 minutes as follows:

| Sample No. | Acid/Couping Agent Ratio | Cure Temp. | Dwell Time |
|---|---|---|---|
| 1 | 0.5 | 240 | 5 |
| 2 | 0.5 | 265 | 10 |
| 3 | 0.5 | 290 | 15 |
| 4 | 2.0 | 240 | 10 |
| 5 | 2.0 | 265 | 15 |
| 6 | 2.0 | 290 | 5 |
| 7 | 3.5 | 240 | 15 |
| 8 | 3.5 | 265 | 5 |
| 9 | 3.5 | 290 | 10 |

Sample 1 had excellent appearance, was impervious to hair dye, was nearly impervious to iodine and passed the Gardner adhesion test. The Taguchi curves suggest a formulation having an acid ratio of 0.6 cured for five minutes at 240° F. would exhibit the best overall properties.

What is claimed is:

1. A lacquer composition comprising an amic acid, an alkoxysilane and a silane coupling agent, said amic acid being the reaction product of an aromatic or aliphatic dianhydride and an aminoalkyltrialkoxysilane or aminoaryltrialkoxysilane, said alkoxysilane being a tetra($C_1$–$C_3$)alkoxysilane, and said silane coupling agent being a glycidoxy($C_2$–$C_4$)alkyltri($C_1$–$C_2$)alkoxysilane.

2. The lacquer composition of claim 1 wherein the alkoxysilane is tetraethoxysilane.

3. The lacquer composition of claim 1 wherein the silane coupling agent is 3-glycidoxypropyltrimethoxysilane.

4. A protective coating comprising the reaction product of the to lacquer composition of claim 1.

5. A lacquer composition comprising an amic acid, an alkoxysilane and a silane coupling agent, said amic acid being the reaction product of pyromellitic dianhydride or the dianhydride of butanetetracarboxylic acid and an amino($C_2$–$C_4$)alkyltri($C_1$–$C_3$)alkoxysilane, said alkoxysilane being a tetra($C_1$–$C_3$)alkoxysilane, and said silane coupling agent being a glycidoxy($C_2$–$C_4$)alkyltri($C_1$–$C_2$)alkoxysilane.

6. A protective coating comprising the reaction product of the lacquer composition of claim 2.

7. A protective coating comprising the reaction product of the lacquer composition of claim 3.

8. A protective coating comprising the reaction product of the lacquer composition of claim 5.

9. A lacquer composition comprising (a) an alkoxysilane and (b) an alkoxysilane terminated polyamic acid or an alkoxysilane terminated polyimide.

10. The lacquer composition of claim 9 wherein the alkoxysilane is a tetra($C_1$–$C_3$)alkoxysilane or a tri($C_1$–$C_3$)alkoxysilane.

11. The lacquer composition of claim 10 wherein the alkoxysilane is tetraethoxysilane.

12. The lacquer composition of claim 9 further comprising a glycidoxy($C_2$–$C_4$)alkyltri($C_1$–$C_2$)alkoxysilane coupling agent.

13. The lacquer composition of claim 12 wherein the coupling agent is 3-glycidoxypropyltrimethoxysilane.

14. A protective coating comprising the reaction product of the lacquer composition of claim 9.

15. A protective coating comprising the reaction product of the lacquer composition of claim 10.

16. A protective coating comprising the reaction product of the lacquer composition of claim 11.

17. A protective coating comprising the reaction product of the lacquer composition of claim 12.

18. A protective coating comprising the reaction product of the lacquer composition of claim 13.

* * * * *

UNITED STATES PATENT AND TRADEMARK OFFICE

CERTIFICATE OF CORRECTION

PATENT NO. : 5,036,145

DATED : July 30, 1991

INVENTOR(S) : Garry K. Echterling et al

It is certified that error appears in the above-identified patent and that said Letters Patent is hereby corrected as shown below:

Column 1, line 35, the numeral "6600" should read "6500".

Col. 3

Formula (1), "1" should read "1"; "2" should read "2"; and "3" should read "3".

Formula (2), "4" should read "4" and "5" should read "5".

Formula (3), "5" should read "5" and "6" should read "6".

Cols. 5-6

Formula (4) should read as follows:

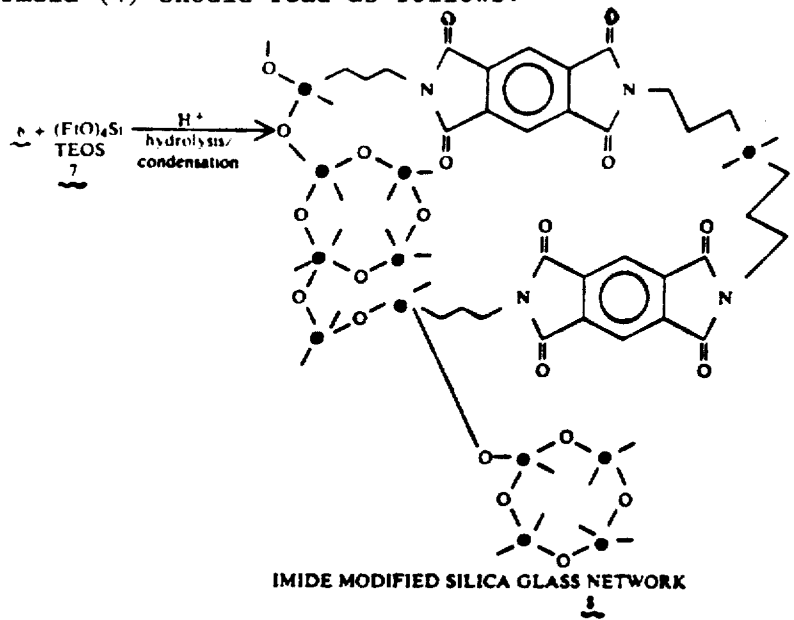

UNITED STATES PATENT AND TRADEMARK OFFICE
CERTIFICATE OF CORRECTION

PATENT NO. : 5,036,145

DATED : July 30, 1991

INVENTOR(S) : Garry K. Echterling et al

It is certified that error appears in the above-identified patent and that said Letters Patent is hereby corrected as shown below:

Cols. 5-6

Formula (1'), "1'" should read "1'".

Formula (2'), "3'" should read "3'" and "4" should read "4"; the term "POLYMIC" should read "POLYAMIC".

Cols. 5-6

Formula (3'), "5'" should read "5'".

Formula (1''), "1" should read "1" and "2''" should read "2''".

Col. 7

Formula (1'''), "1'" should read "1'" and "2''" should read "2''".

UNITED STATES PATENT AND TRADEMARK OFFICE
CERTIFICATE OF CORRECTION

PATENT NO. : 5,036,145

DATED : July 30, 1991

INVENTOR(S) : Garry K. Echterling et al

It is certified that error appears in the above-identified patent and that said Letters Patent is hereby corrected as shown below:

Cols. 9-12

Formula (6), after the reactor arrow, should read as follows:

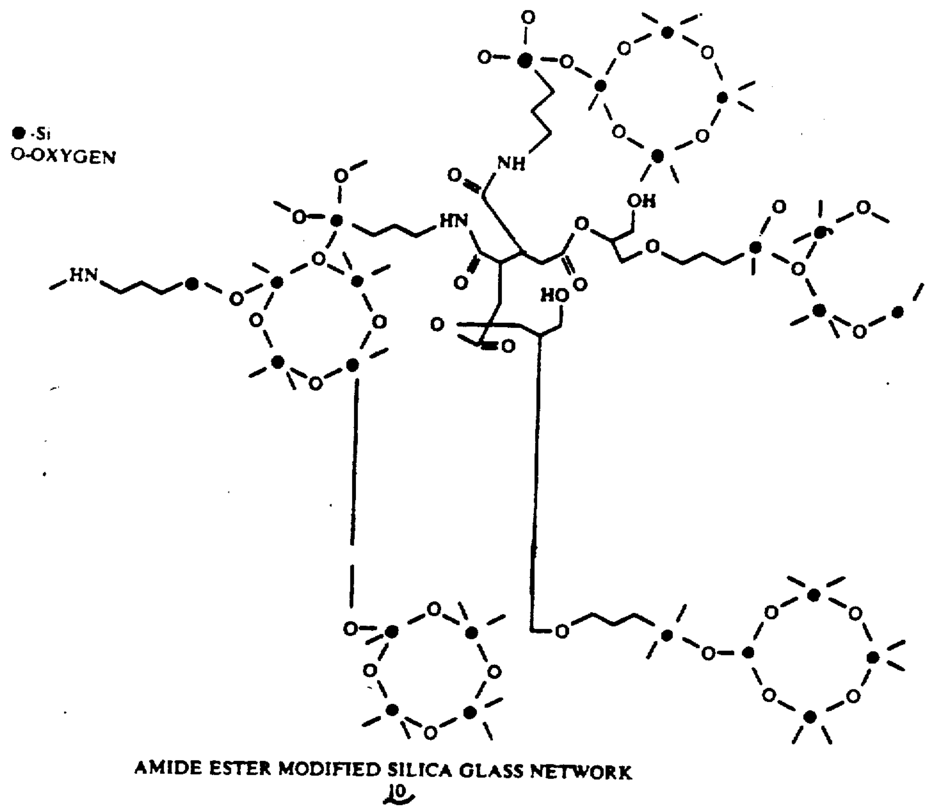

UNITED STATES PATENT AND TRADEMARK OFFICE

CERTIFICATE OF CORRECTION

PATENT NO. : 5,036,145

DATED : July 30, 1991

INVENTOR(S) : Garry K.Echterling et al

It is certified that error appears in the above-identified patent and that said Letters Patent is hereby corrected as shown below:

Col. 12

Formula (6) also, "5'''" should read "5''".

Formula (5''), "1" should read "1" and "7" should read "7".

Formula (5'''), "1" should read "1" and "7'" should read "7'".

Column 14, line 14, the phrase " <0.mil" should read "0.1 mil".

Claim 4, column 14, line 66, the word "to" is extraneous.

Signed and Sealed this

Twenty-second Day of December, 1992

*Attest:*

DOUGLAS B. COMER

*Attesting Officer* *Acting Commissioner of Patents and Trademarks*